United States Patent
Anderson et al.

(10) Patent No.: US 7,697,412 B2
(45) Date of Patent: Apr. 13, 2010

(54) CHANNEL ESTIMATION AND EQUALIZATION OF OFDM RECEIVERS

(75) Inventors: Adrian John Anderson, Monmouthshire (GB); Paul Damon Murrin, Chepstow (GB)

(73) Assignee: Imagination Technologies Limited, Hertfordshire (GB)

(*) Notice: Subject to any disclaimer, the term of this patent is extended or adjusted under 35 U.S.C. 154(b) by 509 days.

(21) Appl. No.: 11/707,210

(22) Filed: Feb. 15, 2007

(65) Prior Publication Data

US 2008/0123516 A1    May 29, 2008

(30) Foreign Application Priority Data

Nov. 24, 2006  (GB)  ................................ 0623499.1

(51) Int. Cl.
    *H04J 11/00*    (2006.01)
(52) U.S. Cl. ........................................ 370/208; 375/260
(58) Field of Classification Search ................ 370/203, 370/208; 375/260
    See application file for complete search history.

(56) References Cited

U.S. PATENT DOCUMENTS

2007/0058733 A1 * 3/2007 Masse et al. ................ 375/260

FOREIGN PATENT DOCUMENTS

| EP | 1 367 788 A1 | 12/2003 |
|----|--------------|---------|
| EP | 1 032 169    | 9/2005  |
| EP | 1 349 335    | 9/2007  |

OTHER PUBLICATIONS

Great Britain Patent Office Combined Search and Examination Report under Sections 17 and 18(3) dated Feb. 28, 2007 (5 pages).
"Channel Estimation Techniques Based on Pilot Arrangement in OFDM Systems", by Sinem Coleri et al, IEEE Transactions on Broadcasting, vol. 48, No. 3, Sep. 2002, pp. 223-229.

* cited by examiner

*Primary Examiner*—Ricky Ngo
*Assistant Examiner*—Pao Sinkantarakorn
(74) *Attorney, Agent, or Firm*—Flynn, Thiel, Boutell & Tanis, P.C.

(57) ABSTRACT

A method and receiver for optimizing the processing of received Orthogonal Frequency Divisional Multiplexed (OFDM) signals, in which a choice is provided as to which channel estimation and equalization technique (of a number of available techniques) to use for each symbol or symbols of the received OFDM signal. Accordingly, the most appropriate technique can be selected for each symbol or symbols.

29 Claims, 8 Drawing Sheets

CHANNEL ESTIMATION AND EQUALIZATION OF OFDM RECEIVERS

FIELD OF THE INVENTION

The invention relates to a receiver and method for optimising the processing of a received OFDM (Orthogonal Frequency Divisional Multiplexed) signal.

BACKGROUND OF THE INVENTION

OFDM (Orthogonal Frequency Division Multiplexing) is a transmission scheme used in a number of applications including digital audio broadcasting and digital TV systems (e.g. DVB-T (Digital Video Broadcasting-Terrestrial), DVB-H (Digital Video Broadcasting-Handheld) and ISDB-T (Integrated Services Digital Broadcasting-Terrestrial)).

The bit stream that is to be transmitted is split into several parallel bit streams, typically hundreds or thousands. The available frequency spectrum is split into several channels and each low bit rate stream is transmitted over one channel using some sort of known modulation scheme e.g. QAM (Quadrature Amplitude Modulation) or PSK (Phase Shift Keying). The symbols have relatively long duration so as to improve the tolerance to multi-path distortion. The channel frequencies are chosen such that the modulated data streams are orthogonal to each other. This means that each channel can be deciphered independently at the receiver, since crosstalk between the sub-channels is eliminated.

In practice, each of the sub-channels may be distorted by the transmission channel such that the amplitude and phase of each sub-carrier must be equalized in the receiver to give good performance using coherent demodulation. The receiver needs a good estimate of the transmission channel in order to carry out equalization. In order to deal with this in the digital TV systems mentioned above, scattered pilots are inserted at regular intervals across the frequency span of each symbol.

Each pilot is a symbol transmitted with known amplitude and phase and the pilots are used for channel estimation in the receiver. In the particular transmission schemes discussed above, every 12th sub-carrier (in the frequency direction) of each symbol is a pilot.

In order to increase the effective sampling frequency of the channel (in the frequency direction), the pilot sampling grid is advanced by three sub-carriers on every consecutive symbol in time. This leads to a pilot sampling grid in the time-frequency plane as shown in FIG. 1.

Figure 1:
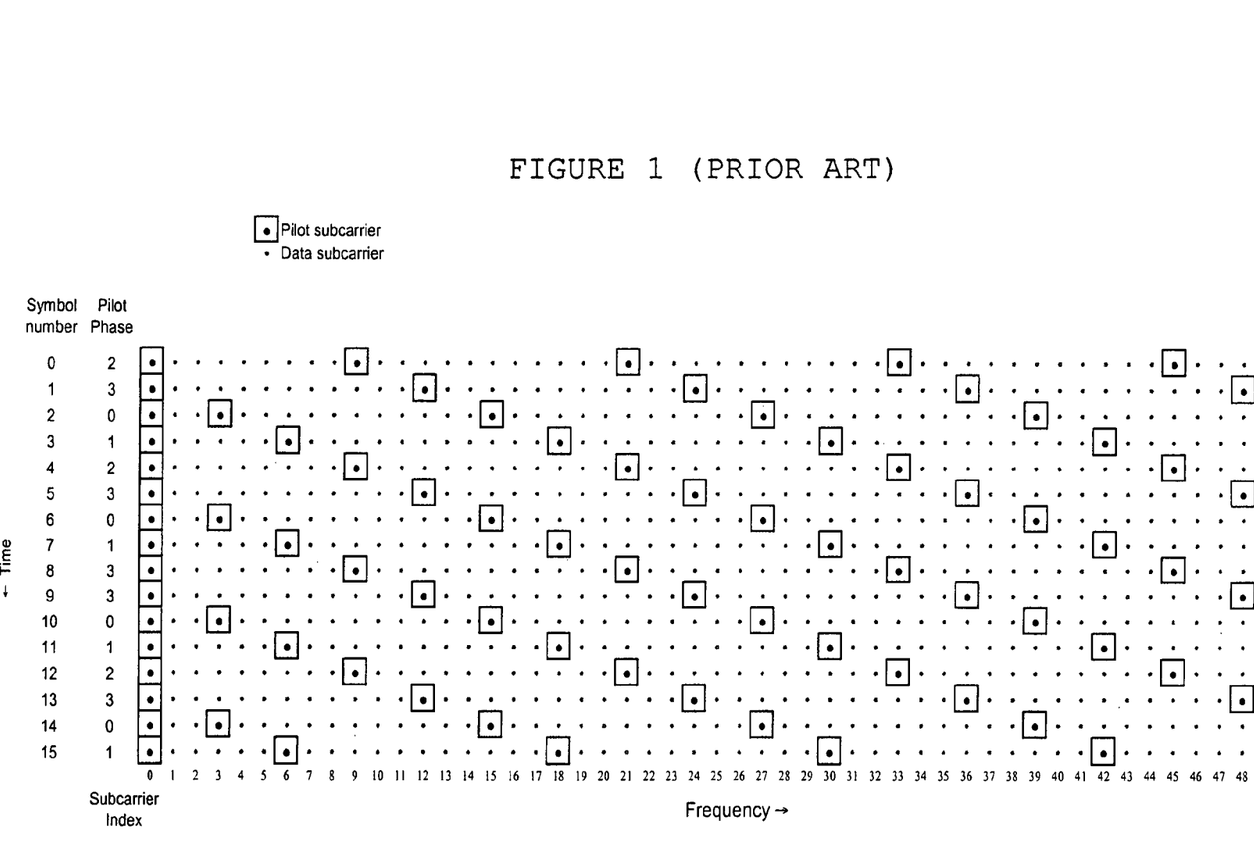
FIG. 1 is a 2D frequency-time plot showing scattered pilot sub-carriers for a number of digital TV OFDM transmission systems.

In FIG. 1, time (i.e. symbol number n) is shown on the y-axis. The oldest symbol is at the top of the plot (symbol number 0) and the most recently received symbol is at the bottom of the plot (symbol number 15). Frequency (i.e. sub-carrier k) is shown on the x-axis. Typically, there will be many more sub-carriers per symbol than are shown in FIG. 1. As indicated by the key of FIG. 1, each sub-carrier is shown by a dot and the scattered pilot sub-carriers are shown by a dot overlaid with a rectangle.

Note, in FIG. 1, that some sub-carriers, such as sub-carrier index k=0, are designated continuous pilots and as such are transmitted as a known pilot for every symbol n.

Channel estimation at the receiver usually uses the scattered pilots. In the process, the receiver aims to form an estimate of the distortion applied by the channel for each sub-carrier of each symbol received. Ultimately, the receiver must form a channel estimate for each active data sub-carrier of the symbol, and then it must use that channel estimate to equalize the received OFDM data.

Figure 2:
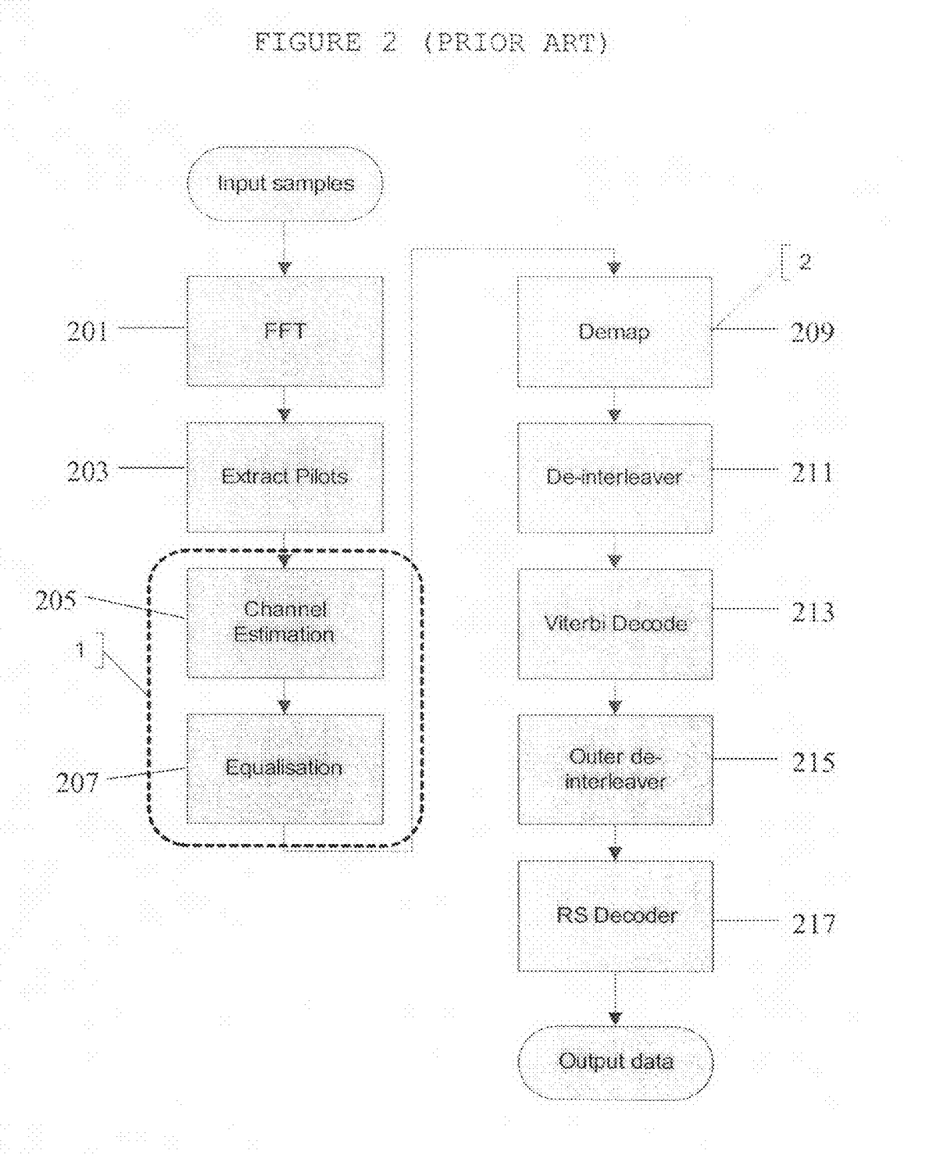
FIG. 2 shows the processing steps performed in a conventional OFDM receiver.

A conventional DVB-H receiver follows the steps shown in the flowchart of FIG. 2 to process each OFDM symbol. Input samples are received and output data is produced.

At step 201, the Fast Fourier Transformer (FFT) takes the well-timed OFDM symbols and transforms them from the time domain to the frequency domain by applying a Fourier transform.

At step 203, the pilots are extracted from the symbol. Both continuous pilots and scattered pilots may be used to assist the receiver to estimate the channel for each sub-carrier position.

At step 205, channel estimation is performed. Information, typically from the inserted pilots, is used to derive an estimate of the distortion produced by the channel for each active sub-carrier of the OFDM symbol. As already mentioned, for an OFDM receiver, the channel estimate is typically a single complex value per active sub-carrier.

At step 207, the channel estimate is inverted and the equalizer uses this to cancel, as best as possible, the distortion introduced by the channel and restore each OFDM sub-carrier to that which was produced in the transmitter.

At step 209, the demapper uses the result of the equalizer along with knowledge of the modulation scheme used (e.g. QPSK, 16-QAM or 64-QAM) and channel state information to produce a number of soft decisions for each sub-carrier.

At step 211, de-interleaving is performed. The de-interleaver does the scrambling across frequency that was applied by the interleavers of the transmitter. This helps to spread localized frequency distortions, which improves the performance of the Viterbi decoder to typical impairments.

At step 213, the Viterbi decoder estimates the most likely path through a trellis using the likelihood information in the soft-decisions and knowledge of the convolutional code that was used in the transmitter.

At step 215, the outer de-interleaver spreads information across time to reduce the effect of distortions that are localised in time. The purpose of the outer de-interleaver is to de-correlate the error bursts at the output of the Viterbi decoder. This ensures that the Reed-Solomon decoder is not overwhelmed by a large number of sequential errors from the Viterbi decoder.

The final step 217, is Reed-Solomon decoding. The Reed-Solomon decoder provides an additional level of error correction for any residual errors that are not corrected by the Viterbi decoder.

There are a number of techniques that may be used to form a channel estimate at step 205 of FIG. 2.

Figure 3:
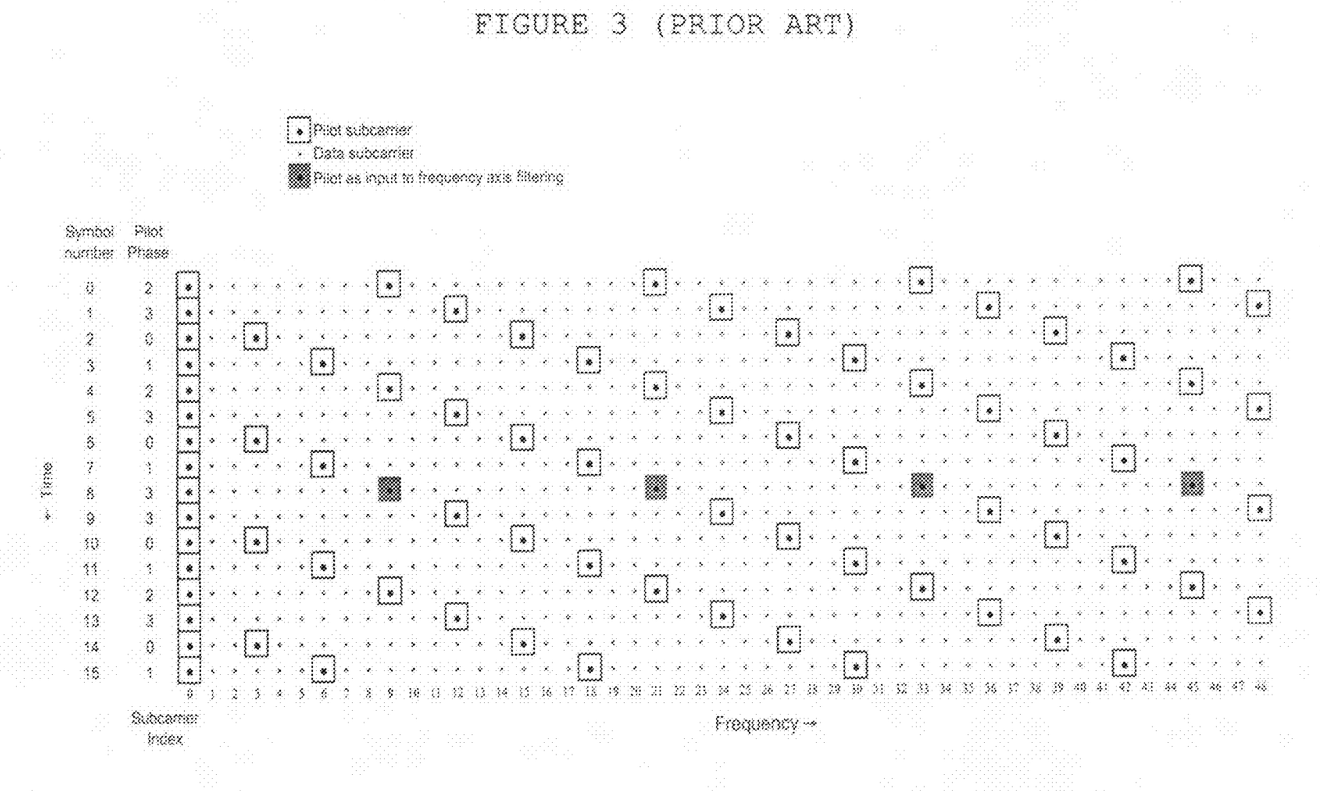
FIG. 3 is a 2D frequency-time plot showing filtering of the scattered pilots in the frequency direction.

In a first technique, the received pilot sub-carriers may be interpolated (upsampled) along the frequency axis. (In the transmission systems mentioned above, this would comprise interpolating the scattered pilots by a factor 4 in the frequency direction. This will give a line of virtual pilots at every third sub-carrier in the frequency direction. These resulting virtual pilots can be interpolated by a factor 3 in the frequency direction to give a sample of the channel response for every sub-carrier.) The pilot sub-carriers that may be used for such interpolation are shown in FIG. 3.

Figure 4:
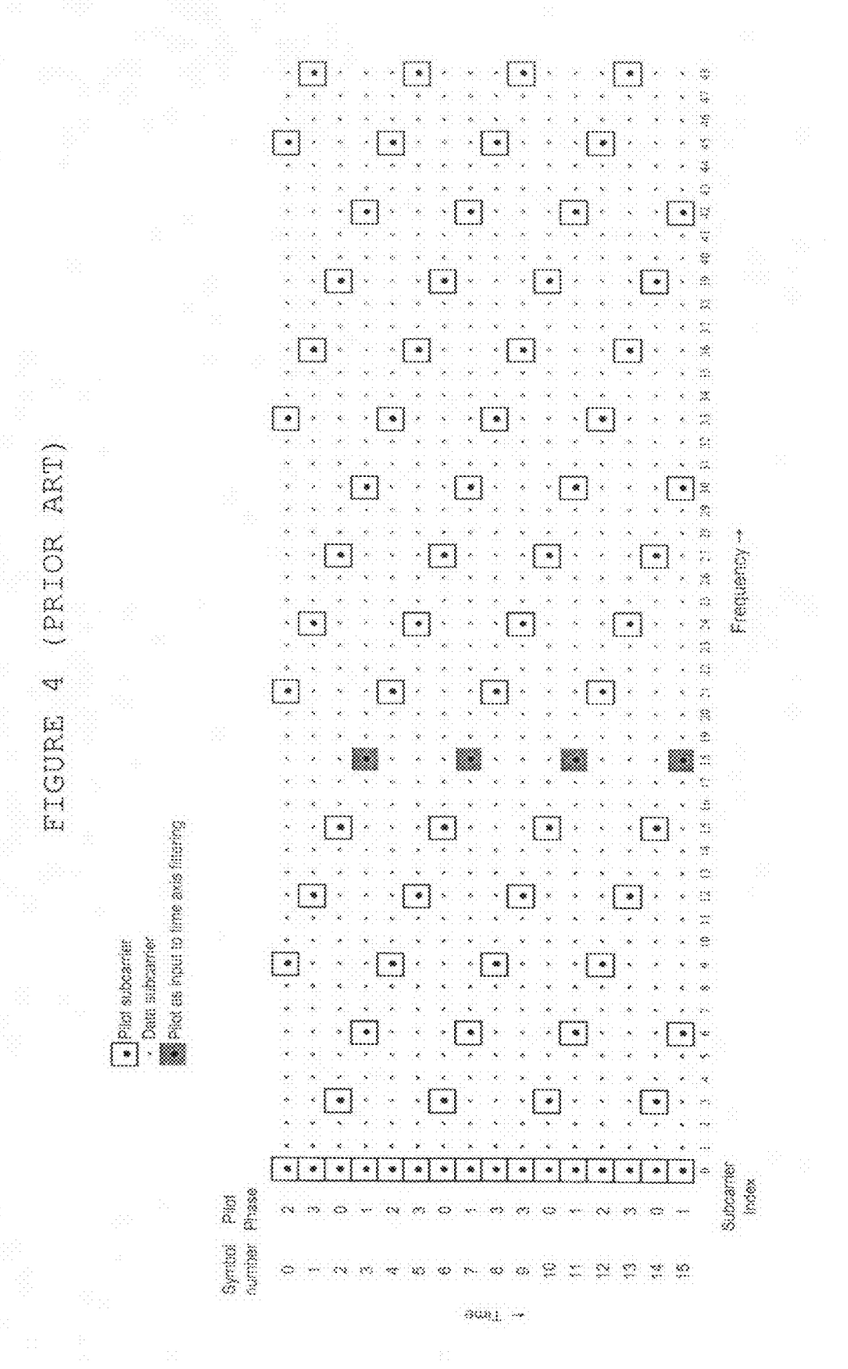
FIG. 4 is a 2D frequency-time plot showing filtering of the scattered pilots in the time direction.

Alternatively, the received pilot sub-carriers may be interpolated along the time axis. (In the transmission systems mentioned above, this would comprise interpolating the scattered pilots by a factor 4 in the time direction. This will give a line of virtual pilots at every third sub-carrier in the frequency direction. These resulting virtual pilots can be interpolated by a factor 4 in the frequency direction to give a sample of the channel response for every sub-carrier.) The pilot sub-carriers that may be used for such interpolation are shown in FIG. 4.

Alternatively, a channel estimate may be formed by data-directed techniques that use information from both the pilot sub-carriers and the data sub-carriers.

The various techniques for channel estimation (those listed above and others) each have different strengths and weaknesses, and one may perform better than the others, given a particular type of channel distortion.

OFDM receivers for the TV standards mentioned above (DVB-T, DVB-H and ISDB-T) are required to operate in a wide variety of channel impairments e.g. additive noise, highly frequency selective channels, high levels of Doppler shift causing rapidly changing channel conditions and inter-carrier interference (ICI), and high levels of co-channel and adjacent channel interference.

A particular OFDM receiver may achieve acceptable performance in all the different conditions (channel impairments) using a design of equalizer that is a compromise for all types of channel impairment. However, for any one set of channel conditions, a receiver may achieve better performance if it uses an equalizer that is specifically designed to cope with the particular channel conditions.

In one example, an equalizer may be designed to use interpolation of pilots along the time axis using a delay store of received pilots from a number of consecutive symbols (see FIG. 4). An equalizer like this might give good performance at low Doppler frequencies over a wide range of delay spreads, but it will give poor performance if the Doppler frequency is high.

In another example, an equalizer may be designed to use interpolation of pilots along the frequency axis using received pilots on one symbol (see FIG. 3). An equalizer like this might give good performance for a channel with low delay spread over a wide range of Doppler frequencies, but it will give poor performance if the delay spread is high.

Thus, a problem associated with known receivers is that optimal receiver performance cannot be achieved across a wide range of channel conditions.

It is an object of the invention to provide a method and apparatus which avoids or mitigates the problems of known systems described above.

SUMMARY OF THE INVENTION

In general terms, the invention provides a method and receiver for OFDM signals, in which a choice is provided as to which channel estimation and equalization technique (of a number of available techniques) to use for each symbol or symbols of the received OFDM signal. Thus, the most appropriate technique can be selected for each symbol or symbols.

According to a first aspect of the invention, there is provided a method for optimising the processing of a received OFDM (Orthogonal Frequency Division Multiplexed) signal, the OFDM signal comprising a plurality of symbols in the time direction, each symbol comprising a plurality of sub-carriers in the frequency direction, the method comprising the steps of: a) providing a plurality of techniques for channel estimation and equalization of a received OFDM signal; b) receiving one or more symbols of the OFDM signal; c) selecting one of the plurality of techniques to be used on the received one or more symbols or a further one or more symbols of the OFDM signal; d) performing channel estimation and equalization on the received one or more symbols of the OFDM signal; and e) repeating steps b), c) and d).

Because a different estimation and equalization technique can be selected for each one or more symbols of the received OFDM signal, the processing can be optimised since, for each one or more symbols, the most appropriate technique can be selected. Some of the techniques will cope better with particular channel conditions than others, so the method provides a way to benefit from the different properties of different equalization techniques in one given receiver.

In one embodiment, step c) comprises selecting one of the plurality of techniques to be used on the received one or more symbols of the OFDM signal, and step d) comprises performing channel estimation and equalization on the received one or more symbols of the OFDM signal using the selected technique.

In another embodiment, step c) comprises selecting one of the plurality of techniques to be used on a further one or more symbols of the OFDM signal, and, in a further iteration of steps b), c) and d) in accordance with step e), step d) comprises performing channel estimation and equalization on the further received one or more symbols of the OFDM signal using the selected technique.

Thus, the channel estimation and equalization technique may be selected for the current one or more symbols or for a future one or more symbols of the OFDM signal.

Preferably, step c) of selecting comprises: performing channel estimation and equalization on the received one or more symbols of the OFDM signal for at least some of the plurality of techniques using at least some of the sub-carriers in the received one or more symbols; and comparing the results of the at least some of the plurality of techniques.

The channel estimation and equalization on the received one or more symbols of the OFDM signal for each of the at least some of the plurality of techniques may be performed concurrently. Alternatively, the channel estimation and equalization on the received one or more symbols of the OFDM signal for each of the at least some of the plurality of techniques may be performed one after another.

According to a first embodiment, step c) of selecting comprises: performing channel estimation and equalization on the received one or more symbols of the OFDM signal for each of the plurality of techniques using all the sub-carriers in the received one or more symbols; and comparing the results of all of the plurality of techniques.

This embodiment provides a very effective way to select the most appropriate technique to use on a particular symbol or symbols of the received OFDM signal, but it does require a lot of processing time. Also, if the symbol or symbols comprises many OFDM symbols, this embodiment also requires a large amount of storage.

In the first embodiment, preferably, from the results of the performing of the channel estimation and equalization on the received one or more symbols of the OFDM signal, a distortion parameter can be derived for each sub-carrier in the received one or more symbols for each of the plurality of techniques, the distortion parameter defining a measure of the difference between the actual sub-carrier and the ideal sub-carrier for the particular modulation scheme used.

The distortion parameter for each sub-carrier may comprise a distance in the complex plane between the ideal position of the sub-carrier in the complex plane and the actual position of the sub-carrier in the complex plane. For example, if the modulation scheme used for the data sub-carriers of the OFDM signal is 16-QAM, the constellation is known for 16-QAM modulation. Each data sub-carrier is transmitted as one point on the constellation but, because of distortion on the channel that is not perfectly equalized, it will not be located at exactly the correct position in the constellation at the receiver. Thus, a measure of the difference between the actual position and the ideal position can be used as a measure of the channel equalization error.

In the first embodiment, the step of comparing the results of all of the plurality of techniques may comprise comparing the averaged distortion parameter of each technique, averaged over all the sub-carriers in the received one or more symbols of the OFDM signal. By providing an averaged distortion parameter for each of the plurality of techniques, and then comparing those parameters, we have an easy way to see which technique will provide the best result i.e. a received symbol which is closest to the transmitted symbol.

The technique which results in the smallest averaged distortion parameter may be selected. Alternatively, the technique which has the lowest power consumption may be selected, as long as the averaged distortion parameter falls within a predetermined acceptable range.

In the first embodiment, step d) of performing channel estimation and equalization on the received one or more symbols of the OFDM signal may comprise re-using the results of the performing step of the first embodiment. This is advantageous because it means that the computation does not have to be repeated. However, it does mean that the channel estimation and equalization results of all the techniques have to be stored, which may require considerable memory space particularly if there are a large number of available techniques.

Alternatively, in the first embodiment, step d) of performing channel estimation and equalization on the received one or more symbols of the OFDM signal may comprise re-performing channel estimation and equalization on the received one or more symbols of the OFDM signal using the selected technique. This is advantageous because the channel estimation and equalization results of all the techniques do not have to be stored. However, it does require extra processing time since the computation must be repeated.

According to a second embodiment, step c) of selecting comprises: performing channel estimation and equalization on the received one or more symbols of the OFDM signal for each of the plurality of techniques using only a subset of the sub-carriers in the received one or more symbols; and comparing the results of all of the plurality of techniques.

Because only a subset of the sub-carriers are used for channel estimation and equalization, this reduces the power consumption.

In the second embodiment, preferably, from the results of the performing of the channel estimation and equalization on the received one or more symbols of the OFDM signal, a distortion parameter can be derived for each sub-carrier in the subset of sub-carriers, for each of the plurality of techniques, the distortion parameter defining a measure of the difference between the equalized sub-carrier and the ideal sub-carrier for the particular modulation scheme used.

The distortion parameter for each sub-carrier may comprise a distance in the complex plane between the ideal position of the sub-carrier in the complex plane and the actual position of the equalized sub-carrier in the complex plane.

In the second embodiment, the step of comparing the results of all of the plurality of techniques may comprise comparing the averaged distortion parameter of each technique, averaged over all the sub-carriers in the subset of sub-carriers.

The technique which results in the smallest averaged distortion parameter may be selected. Alternatively, the technique which has the lowest power consumption may be selected, as long as the averaged distortion parameter falls within a predetermined acceptable range.

Preferably, in the second embodiment, the subset of sub-carriers selected for each received one or more symbols of the OFDM signal comprises the continuous pilot sub-carriers and the TPS pilot sub-carriers.

According to a third embodiment, step c) of selecting comprises: storing running averaged distortion parameters, averaged over at least some of the sub-carriers in the received one or more symbols, for each of the plurality of techniques, the distortion parameter for each sub-carrier for each technique defining a measure of the difference between the actual equalized sub-carrier and the ideal sub-carrier for the particular modulation scheme used; performing channel estimation and equalization on the received one or more symbols of the OFDM signal for only a subset of the plurality of techniques; from the results of the channel estimation and equalization step, deriving an averaged distortion parameter for each technique of the subset of the plurality of techniques; using the derived averaged distortion parameters to updated the running averaged distortion parameters for each technique of the subset of the plurality of techniques; and comparing the current running averaged distortion parameters of all of the plurality of techniques.

The distortion parameter for each sub-carrier may comprise a distance in the complex plane between the ideal position of the sub-carrier in the complex plane and the actual position of the equalized sub-carrier in the complex plane.

The technique which results in the smallest current running averaged distortion parameter may be selected. Alternatively, the technique which has the lowest power consumption may be selected, as long as the current running averaged distortion parameter falls within a predetermined acceptable range.

According to the first aspect of the invention, there is also provided a method for optimising the processing of a received OFDM (Orthogonal Frequency Division Multiplexed) signal, the OFDM signal comprising a plurality of symbols in the time direction, each symbol comprising a plurality of sub-carriers in the frequency direction, the method comprising the steps of: a) providing a plurality of methods for channel estimation and equalization of a received OFDM signal; b) receiving one or more symbols of the OFDM signal; c) selecting one of the plurality of methods to be used on the received one or more symbols or a further one or more symbols of the OFDM signal by: i) performing channel estimation and equalization on the received one or more symbols of the OFDM signal for each of the plurality of methods using all the sub-carriers in the received one or more symbols; and ii) comparing the results of all of the plurality of methods; d) performing channel estimation and equalization on the received one or more symbols of the OFDM signal; and e) repeating steps b), c) and d).

According to the first aspect of the invention, there is also provided a method for optimising the processing of a received OFDM (Orthogonal Frequency Division Multiplexed) signal, the OFDM signal comprising a plurality of symbols in the time direction, each symbol comprising a plurality of sub-carriers in the frequency direction, the method comprising the steps of: a) providing a plurality of methods for channel estimation and equalization of a received OFDM signal; b) receiving one or more symbols of the OFDM signal; c) selecting one of the plurality of methods to be used on the received one or more symbols or a further one or more symbols of the OFDM signal by: i) performing channel estimation and equalization on the received one or more symbols of the OFDM signal for each of the plurality of methods using only a subset of the sub-carriers in the received one or more symbols; and ii) comparing the results of all of the plurality of methods; d) performing channel estimation and equalization on the received one or more symbols of the OFDM signal; and e) repeating steps b), c) and d).

According to the first aspect of the invention, there is also provided a method for optimising the processing of a received OFDM (Orthogonal Frequency Division Multiplexed) signal, the OFDM signal comprising a plurality of symbols in the time direction, each symbol comprising a plurality of sub-carriers in the frequency direction, the method comprising the steps of: a) providing a plurality of methods for channel estimation and equalization of a received OFDM signal; b) receiving one or more symbols of the OFDM signal; c) storing running averaged distortion parameters, averaged over at least some of the sub-carriers in the received one or more symbols, for each of the plurality of methods, the distortion parameter for each sub-carrier for each method defining a measure of the difference between the actual equalized sub-carrier and the ideal sub-carrier for the particular modulation scheme used; d) performing channel estimation and equalization on the received one or more symbols of the OFDM signal for only a subset of the plurality of methods; e) from the results of the channel estimation and equalization step d), deriving an averaged distortion parameter for each method of the subset of the plurality of methods; f) using the derived averaged distortion parameters to updated the running averaged distortion parameters for each method of the subset of the plurality of methods; and g) selecting one of the plurality of methods to be used on the received one or more symbols or a further one or more symbols of the OFDM signal by comparing the current running averaged distortion parameters of all of the plurality of methods; h) performing channel estimation and equalization on the received one or more symbols of the OFDM signal; and i) repeating steps b) to h).

According to a second aspect of the invention, there is provided a computer program which, when run on computer means, causes the computer means to carry out the method of the first aspect of the invention.

According to the second aspect of the invention, there is also provided a record carrier having stored thereon a computer program according to the second aspect of the invention.

According to the second aspect of the invention, there is also provided a computer program which, when run on computing means for receiving an OFDM (Orthogonal Frequency Division Multiplexed) signal, the OFDM signal comprising a plurality of symbols in the time direction, each symbol comprising a plurality of sub-carriers in the frequency direction, causes the computer means to carry out the steps of: a) providing a plurality of techniques for channel estimation and equalization of a received OFDM signal; b) receiving one or more symbols of the OFDM signal; c) selecting one of the plurality of techniques to be used on the received one or more symbols or a further one or more symbols of the OFDM signal; d) performing channel estimation and equalization on the received one or more symbols of the OFDM signal; and e) repeating steps b), c) and d).

According to a third aspect of the invention, there is provided a receiver for optimising the processing of a received OFDM (Orthogonal Frequency Division Multiplexed) signal, the OFDM signal comprising a plurality of symbols in the time direction, each symbol comprising a plurality of sub-carriers in the frequency direction, the receiver comprising: a plurality of channel estimators and equalizers, each channel estimator and equalizer being arranged to apply a respective technique for channel estimation and equalization on the received OFDM signal; and means for selecting which of the plurality of channel estimators and equalizers to use on each symbol or symbols of the received OFDM signal.

Because a different estimation and equalization technique can be selected for each one or more symbols of the received OFDM signal, the processing can be optimised since, for each one or more symbols, the most appropriate technique can be selected. Some of the techniques will cope better with particular channel conditions than others, so the method provides a way to benefit from the different properties of different equalization techniques in one given receiver.

In one embodiment, each of the plurality of channel estimators and equalizers is arranged to perform channel estimation and equalization on a received symbol or symbols of the OFDM signal using all the sub-carriers in the received symbol or symbols, and the means for selecting is arranged to compare the results of all of the plurality of channel estimations and equalizations.

In another embodiment, each of the plurality of channel estimators and equalizers is arranged to perform channel estimation and equalization on a received symbol or symbols of the OFDM signal using only a subset of the sub-carriers in the received symbol or symbols, and the means for selecting is arranged to compare the results of all of the plurality of channel estimations and equalizations.

Aspects described in relation to one aspect of the invention may also be applicable to another aspect of the invention.

BRIEF DESCRIPTION OF THE DRAWINGS

Existing systems have already been described with reference to FIGS. 1 to 4, of which.

An embodiment of the invention will now be described with reference to the remaining figures, of which.

DETAILED DESCRIPTION OF A PREFERRED EMBODIMENT

Figure 5:
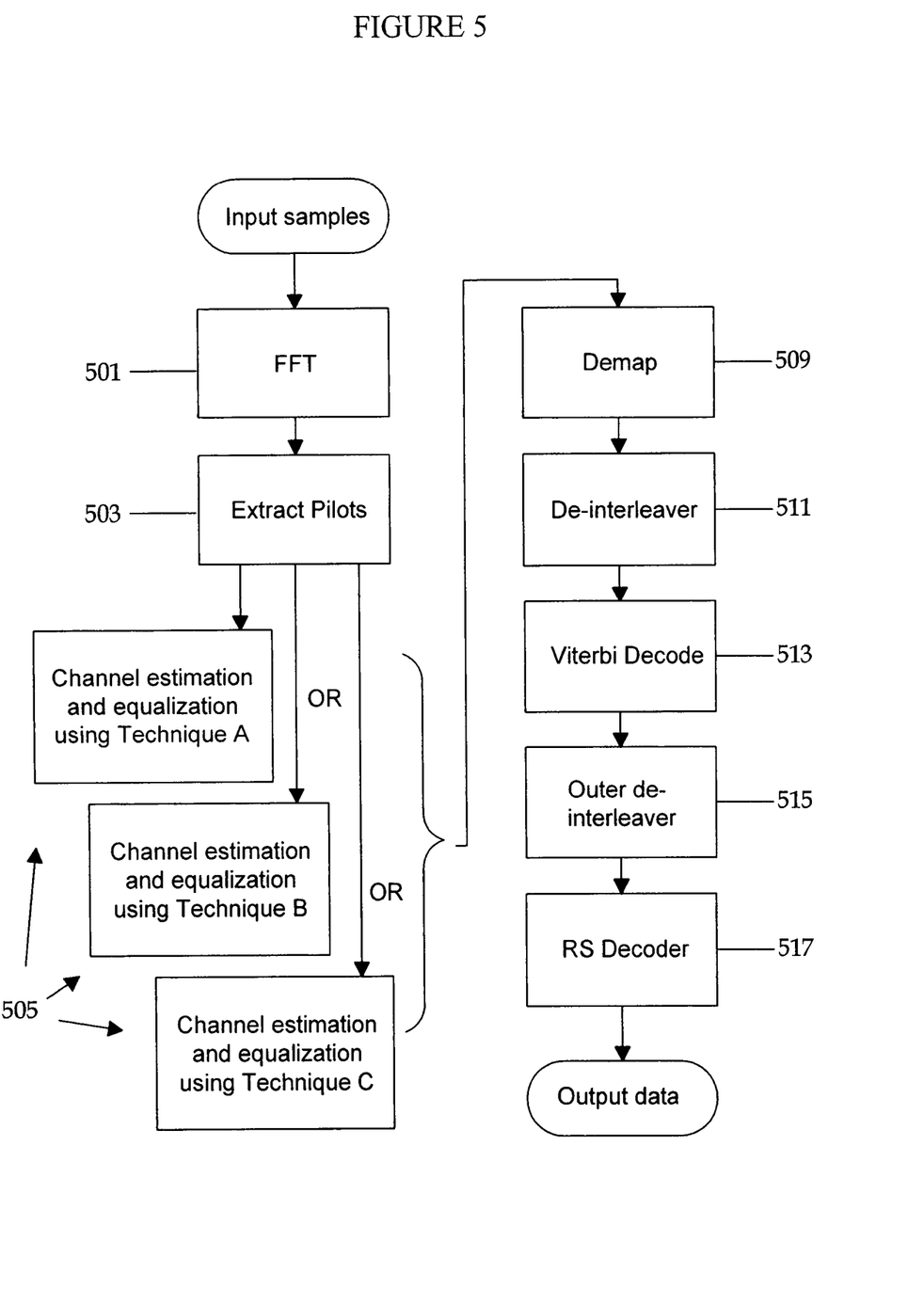
FIG. 5 shows the processing steps performed in an OFDM receiver according to an embodiment of the invention.

FIG. 5 shows the processing steps performed in an OFDM receiver according to an embodiment of the invention. Just like in the flow chart of FIG. 2, the OFDM receiver performs Fast Fourier Transformation (step 501), pilot extraction (step 503), channel estimation and equalization (step 505), de-mapping (step 509), de-interleaving (step 511), Viterbi decoding (step 513), outer de-interleaving (step 515) and Reed-Solomon decoding (step 517). However, in the processing steps of FIG. 5, a choice is provided at the channel estimation and equalization step. In this example, the receiver can perform channel estimation and equalization using Technique A OR Technique B OR Technique C. The selection scheme for selecting which of the available techniques is most appropriate will now be described.

The equalizer for each OFDM symbol is selected from a set of available channel estimation techniques (in the FIG. 5 example, three techniques A, B and C are available, although a different number of techniques may be available). Each technique may have been optimised for a specific range of channel conditions. The selection scheme ensures that the most appropriate equalizer is chosen for any particular received channel conditions.

In the embodiments which will now be described, the most appropriate equalizer technique is selected by comparing the values of a distortion metric calculated for each candidate equalizer. If the best possible receiver performance is required, then the equalizer with the lowest distortion metric is chosen. If the lowest possible receiver power consumption is required, then the equalizer with the lowest power is chosen, subject to it having a distortion metric value that meets the minimum performance requirement.

First Embodiment

In a first embodiment, the distortion metric for one equalizer is generated by applying that equalizer to the data and pilot sub-carriers for one received OFDM symbol and measuring the Modulation Error Rate (MER) (also known as the Error Vector Magnitude, EVM) in the equalized sub-carriers. The MER may be evaluated on either the continuous pilots, on the scattered pilots, on the TPS pilots (also known as TMCC pilots), or on the data sub-carriers, or on any combination of these. The TPS (DVB-T/H) or TMCC (ISDB-T) pilots carry information about the transmission mode in operation on the transmitted signal. All the TPS/TMCC pilots in one symbol are modulated with the same data, and the modulation scheme used is BPSK. Thus the set of TPS/TMCC pilots are very predictable: either all the TPS/TMCC pilots on one symbol are transmitted with a value of A+j0 or else all the TPS/TMCC pilots on one symbol are transmitted with a value of −A+j0. This makes them very useful for estimating received signal quality, as the probability of comparing the received signal against the wrong "ideal" constellation point is very low. In comparison, the probability of choosing the wrong "ideal" constellation point for a data sub-carrier modulated with 64-QAM data is quite high.

The modulation scheme used on the data sub-carriers (e.g. 16-QAM) is signalled via a separate and very robust channel i.e. signalled on the TPS/TMCC pilots. Hence the ideal constellation (pattern of all possible symbol positions in the complex plane) is known, so that the MER for each sub-carrier can be calculated as the distance from the received data sub-carrier to the nearest (i.e. ideal) constellation point. This concept of MER can work for a number of modulation schemes—all that is needed is the knowledge of the coordinates in the complex plane of each constellation point.

This first embodiment can provide optimum performance, since all active sub-carriers of the OFDM symbol may be equalized in turn or at the same time, by all of the available equalizer techniques and the MER calculated for each equalizer. This approach will give the most immediate information about the best equalizer to use, allowing the best equalizer to be selected with the minimum delay should the channel conditions change. In a practical receiver, however, the approach of the first embodiment would lead to a high computational load and hence high power consumption.

Let's now consider a specific case to which to apply the steps of the first embodiment. Consider the case of a DVB-H signal with a typical configuration such as:

FFT Mode: 8K (8192 sub-carriers, 6817 active sub-carriers)

Guard Interval: ¼

Modulation Scheme: 16-QAM

Convolutional code-rate: ⅔

We consider the case where synchronisation has been achieved and the receiver has built up a history of information to allow channel equalization (for example pilots from previous symbols).

The Techniques A, B and C (see FIG. 5) available to the receiver are as follows:

Technique A: Interpolation between pilots in both the time and frequency axis with broad filtering (c.f. FIG. 4 with broad filtering). This technique is suitable for channels with a wide delay spread and moderate Doppler frequencies.

Technique B: Interpolation in the frequency axis only using pilots of the current symbol only (c.f. FIG. 3). This technique is suitable for high Doppler frequencies but is not suitable for channels with wide delay spread because of the narrow bandwidth interpolation filters that are required to interpolate between pilot samples on a 12 sub-carrier grid.

Figure 6:
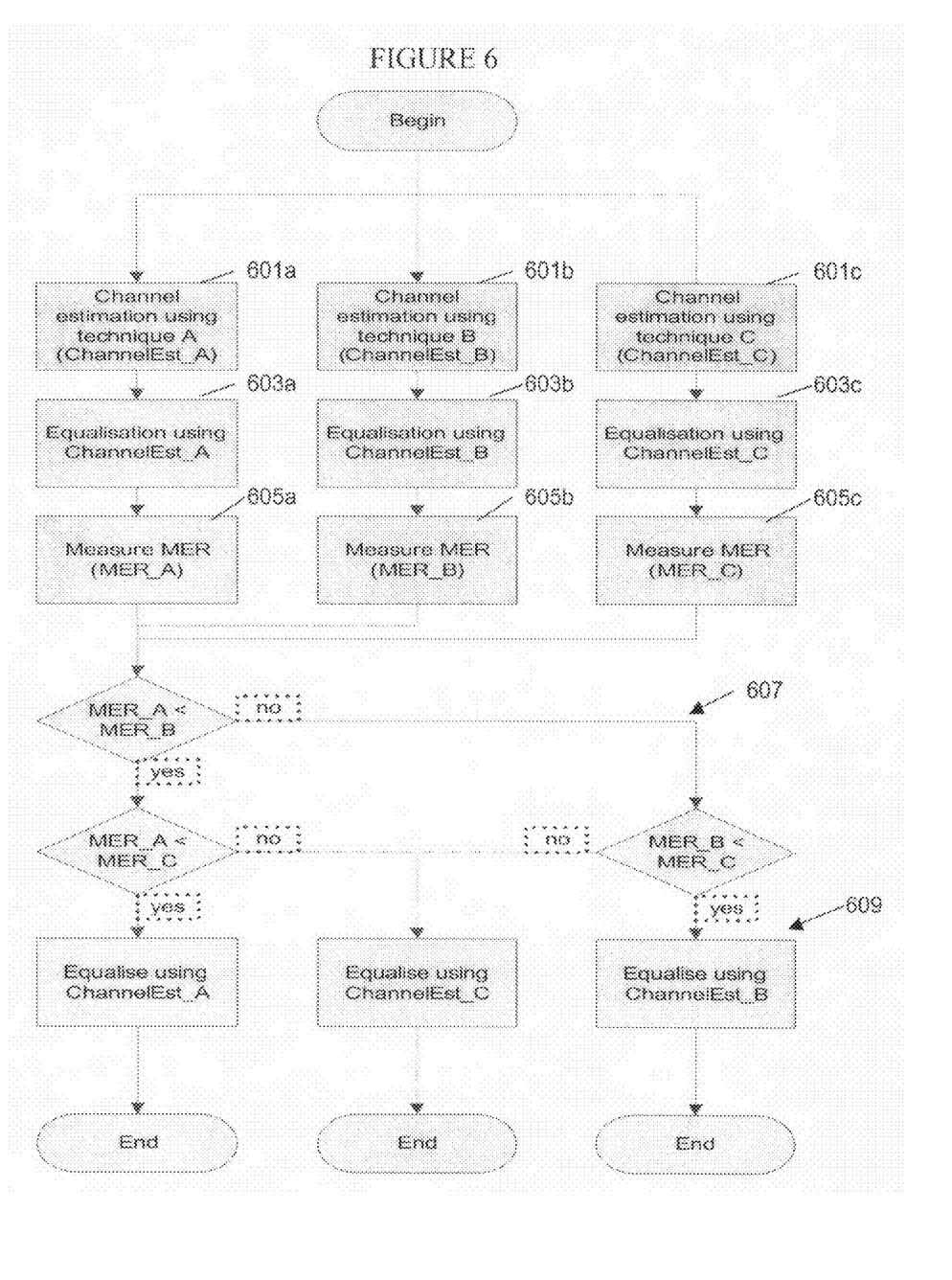
FIG. 6 shows the steps used to select between three available channel estimation techniques in a first embodiment of the invention.

Technique C: Interpolation in both the time and frequency axis with narrow filtering on both axes (c.f. FIG. 4 with narrow filtering). This technique is suited to a channel with narrow delay spread and low Doppler frequency but with high levels of additive noise In this embodiment, the steps for deciding on which technique to use for each received symbol are shown in FIG. 6.

At step 601, channel estimation is performed for all the sub-carriers in the particular symbol using each available technique A, B and C. At step 601*a*, channel estimation using technique A is performed. At step 601*b*, channel estimation using technique B is performed. At step 601*c*, channel estimation using technique C is performed.

At step 603, equalization is performed using each of the three available techniques, from the results of step 601. At step 603*a*, equalization is performed using technique A from the results of step 601*a*. At step 603*b*, equalization is performed using technique B from the results of step 601*b*. At step 603*c*, equalization is performed using technique C from the results of step 601*c*.

At step 605, the MER for each technique is calculated. At step 605*a*, the MER for technique A is calculated. At step 605*b*, the MER for technique B is calculated. At step 605*c*, the MER for technique C is calculated.

As already discussed, the MER may be calculated by comparing the resulting constellation for each technique with the ideal constellation of the particular modulation scheme being used. After equalization, a constellation is available. Rather than de-mapping and de-interleaving this constellation immediately (i.e. proceeding with the next steps in FIG. 5), the MER for each technique is evaluated by measuring the Euclidean distance of each equalized sub-carrier to the closest ideal constellation point using knowledge of the modulation scheme used. Then, the mean MER (over all the sub-carriers in the symbol) is calculated.

The steps of channel estimation, equalization and MER measurement for each technique may be performed concurrently or one after another.

At step 607, the MER measurements for each technique are compared and the technique which provides the lowest mean MER is selected for channel estimation and equalization of this OFDM symbol. In the process shown in FIG. 6, this comparison is performed by comparing the MER of technique A with the MER of technique B. Then, the lowest MER of technique A or technique B is compared with the MER of technique C.

At step 609, the most appropriate channel estimation and equalization technique is selected based on the MER comparisons of step 607, and channel estimation and equalization is performed using the selected technique.

At step 609, either the channel estimation and equalization results from step 603 may be used or channel estimation and equalization using the appropriate technique may be performed again. The former technique saves computation but requires the results for each technique to be saved in memory. Obviously, the more techniques that are available, the more memory space will be required. The latter technique requires duplication of computation but avoids the need for the equalization results from step 603 for all the available techniques to be stored.

Once step 609 has been performed using the selected technique, the results may be input into the de-mapper 509 and subsequent processing may be performed as shown in FIG. 5.

In the process of FIG. 6, once the technique has been selected, the current symbol is processed using that technique. However, alternatively, it could be that the selected technique is used on the next received symbol rather than the current symbol.

Figure 7:
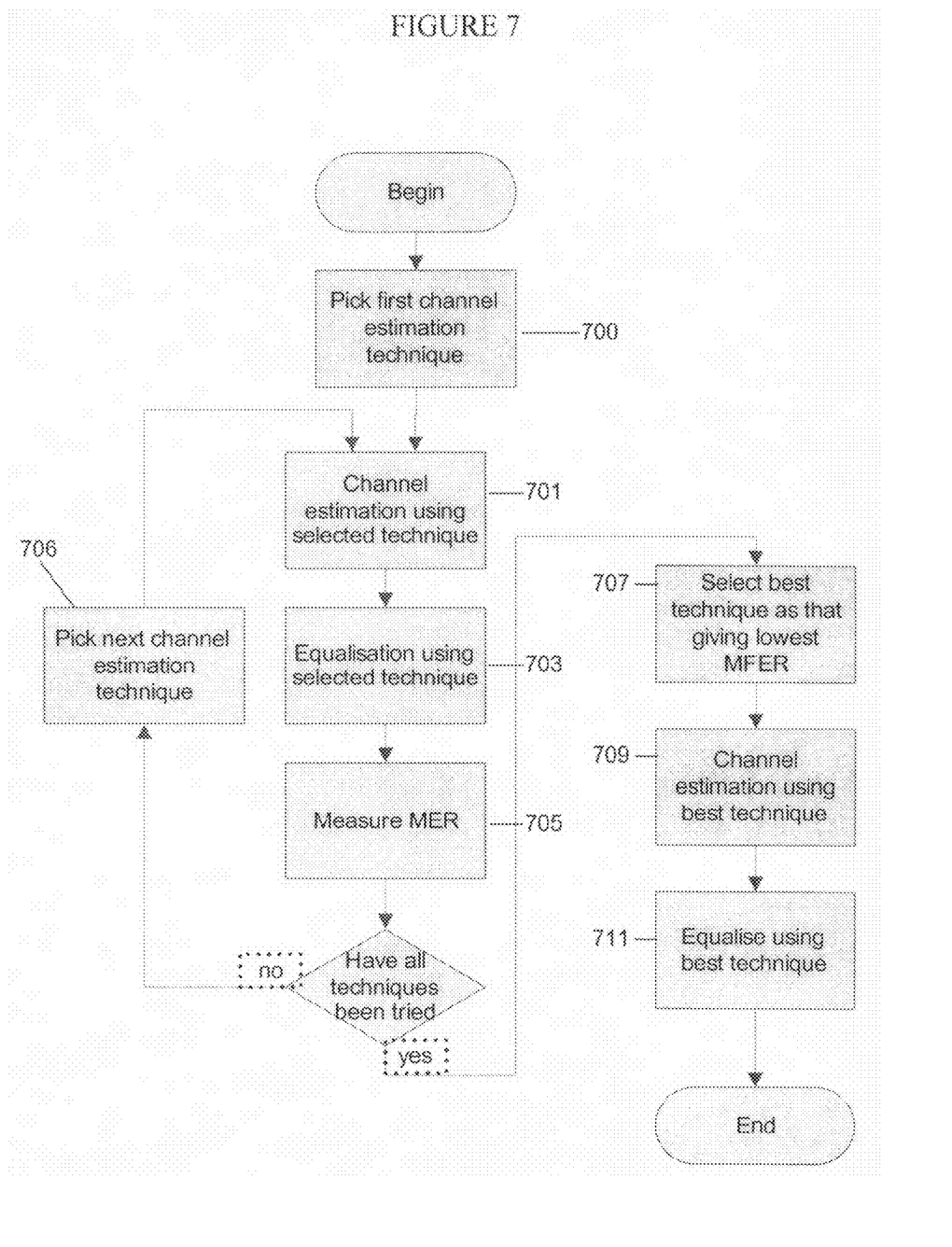
FIG. 7 shows the steps used to select between any number of available channel estimation techniques in the first embodiment of the invention.

FIG. 6 shows the steps of the first embodiment when only three techniques are available for channel estimation and equalization. FIG. 7 is a generalised flow chart for the first embodiment of the invention when an arbitrary number of techniques are available.

At step 700, a first channel estimation technique (of the available techniques) is selected. At step 701, channel estimation is performed using the selected technique. At step 703, equalization is performed using the selected technique from the results of step 701. At step 705, the mean MER across all the sub-carriers of the symbol is calculated. Then, if not all the available techniques have been tried, another technique is selected at step 706 and steps 701, 703 and 705 are performed using that technique. Steps 701, 703 and 705 are repeated for each of the available techniques and then, at step 707, the technique that gives the lowest MER is selected.

At step 709, channel estimation is performed using the selected technique and at step 711 equalization using the selected technique is performed.

As with FIG. 6, steps 709 and 711 may use the results from steps 701 and 703 of the selected technique or channel estimation and equalization may be performed again.

As with FIG. 6, in the process of FIG. 7, once the technique has been selected, the current symbol is processed using that technique. However, alternatively, the selected technique could be used on the next received symbol rather than the current symbol.

In FIG. 7, the channel estimation, equalization and MER measurement for each available technique is performed one after the other, but it is possible for the process to be adapted so that the channel estimation, equalization and MER measurement are performed concurrently for all of the available techniques.

Note that, in this first embodiment, the selection process of FIG. 6 or 7 is performed before each symbol is demodulated, and the available techniques are applied to all the sub-carriers in the symbol.

Second Embodiment

In the first embodiment, the channel estimation and equalization for each available technique were performed over all the sub-carriers of the received OFDM symbol. The power consumption may be reduced, however, by calculating the MER over only a subset of the available sub-carriers on each symbol. The subset should be chosen to give adequate diversity of information from across the bandwidth of the received signal.

The subset may be selected in many ways but in one preferred arrangement, the subset includes only the continuous pilots (although for some channels this subset may not give good results), or only the continuous pilots and the TPS pilots (which gives greater robustness than continuous pilots alone). This technique exploits the fact that channel conditions affect the equalizer performance in a similar way at many points in the signal spectrum.

As with the first embodiment, the MER evaluation may be performed for each candidate equalizer (but this time using only the subset of sub-carriers in the symbol rather than all the sub-carriers in the symbol) and the equalizer with the lowest MER measurement may be selected for demodulation of the received symbol.

The second embodiment could be adapted so that the particular subset of carriers on which the evaluation is performed is changed at each symbol, so that, over time, all the sub-carriers are included in an evaluation. However, if the subset of the subcarriers is chosen to be the continuous pilots and the TPS pilots then it is advantageous to use the same sub-carriers at each symbol.

Thus, in this second embodiment, the selection process is performed before each symbol is demodulated, and the available techniques are applied to only a subset of the sub-carriers in the symbol.

In the first embodiment, we had the option to re-perform the channel estimation and equalization steps at step 609/709 or to re-use those results from previous steps 601,603/701, 703. However, in the second embodiment, the channel estimation and the equalization has been performed only over a subset of the sub-carriers. Thus, either the later channel estimation and equalization must be re-performed over all the sub-carriers (which does not require any storage) or the channel estimation and equalization for the subset could be stored and the later channel estimation and equalization performed over the remaining sub-carriers.

Third Embodiment

In the first and second embodiments, at each symbol, all the available techniques are used so that the MERs for all the available techniques can be compared before the appropriate technique is selected for that symbol.

In this third embodiment, which further reduces the power consumption, only a subset of all the available candidate equalizers are used for evaluation at each symbol. It is ensured that, over a defined evaluation period, all equalizers are evaluated for MER performance. The evaluation may be performed over all the sub-carriers in the symbol (like in the first embodiment) or over only a subset of the sub-carriers in the symbol (like in the second embodiment).

In this third embodiment, at each symbol, the MER is calculated for one or more equalizers from the available candidate equalizers. After the MER is calculated, a running record of the MER for that equalizer is updated and the equalizer candidate having the lowest running MER is selected to perform equalization for the next symbol. This technique exploits the fact that the channel conditions generally do not change rapidly with respect to the OFDM symbol period.

Figure 8:
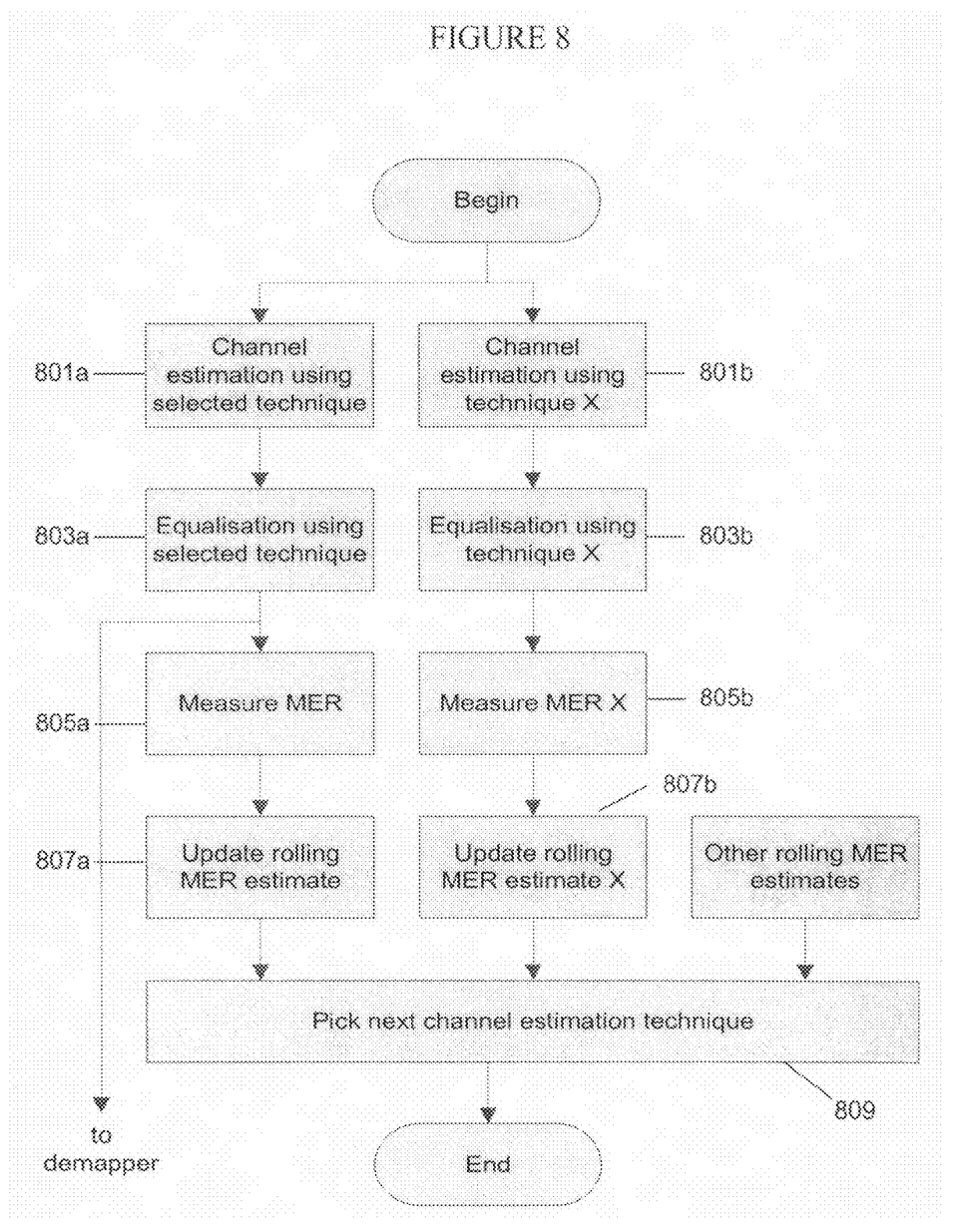
FIG. 8 shows the processing steps used to select between any number of available channel estimation techniques in a third embodiment of the invention.

FIG. 8 shows the process steps for the selection process of the third embodiment. At step 801, channel estimation is performed. At step 801*a*, channel estimation using the technique selected at the previous symbol (or if this is the first received symbol, any selected technique) is performed. At step 801*b*, channel estimation using another technique X from the available techniques is performed.

At step 803, equalization is performed. At step 803*a*, equalization using the selected technique is performed using the results of step 801*a*. At step 803*b*, equalization using technique X is performed using the results of step 801*b*.

At this point, the channel estimation and equalization results from the selected technique are used in the subsequent steps of FIG. 5 (i.e. de-mapping etc).

At step 805, the MER for each technique is calculated. At step 805*a*, the MER for the selected technique is calculated. At step 805*b*, the MER for technique X is calculated.

Then, at step 807, the running MERs are updated with the latest results. At step 807*a*, the running MER for the selected technique is updated. At step 807*b*, the running MER for technique X is updated.

At step 809, the running MERs of all the available techniques are compared and the technique having the lowest MER is selected for the next symbol. Alternatively, the technique which has the lowest power consumption may be selected, as long as the mean distortion parameter falls within a predetermined acceptable range.

In FIG. 8, the selected technique is used on the next received symbol. However, the process could be adapted so that the selected technique is used on the current symbol. In that case, once the running MERs have been updated and compared, the technique having the lowest MER could be used to process the current symbol.

In FIG. 8, only two techniques are evaluated for each symbol, the selected technique and one other technique. However, at each symbol any number of techniques could be evaluated. As already discussed, over a particular period, all techniques should be evaluated and their MER updated.

The running estimate of MER for a particular candidate equalizer may be calculated as the average of all MER measurements for the particular equalizer, or it may be calculated to place more weight on the MER measurements that show poor performance or it may be calculated to place more weight on the recent MER measurements. The application of a higher weighting factor for poor MER measurements is helpful in changing channel conditions, where the MER achieved by a particular equalizer may vary from symbol to symbol. By placing greater emphasis on those symbols where the MER measurement is poor, the equalizer selection decision is made more robust, as it will avoid the use of an equalizer that may perform poorly on some symbols. The equalizer selected at step 809 may be the one with the lowest rolling MER estimate after all MER estimates have been updated. Or, the equalizer selection at step 809 may use further information to modify the selection decision, such as the estimated Doppler frequency, the estimated delay spread or the history of selected equalizers. The application of a higher weighting factor for recent MER measurements is also helpful, especially when the channel conditions are changing over time so that the recent measurements are more likely to be applicable to current symbols.

In all the embodiments described, the different techniques are compared for every symbol. However, it may be appropriate to compare the techniques only every second symbol or even over a larger portion of the signal. The more often the techniques are compared, the more appropriate will be the equalizer technique selected, but the more processing time will be required.

Also, in the embodiments described, the MER is used as the distortion parameter. However, higher performance can be achieved (at the cost of increased computation and delay) by replacing the MER measurement in the above methods with an estimate of the received error rate. The error rate for a particular equalizer may be estimated by a Viterbi decoder operating on the equalized date from the equalizer. Depending on the data standard in operation, this technique may require the application of frequency de-interleaving, bit de-interleaving and time de-interleaving to the equalized data before error correction. For example, for DVB-T or DVB-H, the results of each equalizer trial (on each symbol or multiple consecutive symbols) would need to be de-mapped and de-interleaved then passed to the Viterbi decoder for decoding. The initial state of the Viterbi decoder would need to be preserved from previous computations, or the Viterbi decoder hardware would need to be replicated for each equalizer. The decoded bitstream for each trial could be stored and that with the lowest estimated error rate would be used for subsequent output (to the outer de-interleaver and Reed-Solomon decoder in the DVB-T or DVB-H for example).

As can be seen from the description above, the invention addresses the problem of how to achieve the best receiver performance across a wide range of channel conditions, given a set of equalizers each of which will perform better than all the others in at least one set of channel conditions.

The invention also addresses the problem of how to achieve adequate receiver performance whilst minimizing computational load (and hence power consumption) for a particular channel given a set of equalizers which offer a trade off between performance and power consumption.

The invention claimed is:

1. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
   (a) providing a plurality of techniques for channel estimation and equalization of the received signal;
   (b) receiving at least one of the symbols of the signal;
   (c) selecting one of the techniques to be used on the received symbols or on additional at least one of the symbols of the signal;
   (d) performing the channel estimation and the equalization on the received symbols of the signal; and
   (e) repeating the providing step (a), the receiving step (b), the selecting step (c) and the performing step (d),
   wherein the selecting step (c) further comprises the steps of performing the channel estimation and the equalization on the received symbols of the signal for each of the techniques using all of the sub-carriers in the received symbols, and comparing results of all of the techniques, and
   from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, the distortion parameter comprising a distance in a complex plane between an ideal position of the sub-carrier in the complex plane and an actual position of the equalized sub-carrier in the complex plane.

2. The method according to claim 1, wherein, if the selecting step (c) comprises the step of selecting one of the techniques to be used on the received symbols of the signal, the performing step (d) comprises the step of performing the channel estimation and the equalization on the received symbols of the signal using the selected technique.

3. The method according to claim 1, wherein, if the selecting step (c) comprises the step of selecting one of the techniques to be used on the additional symbols of the signal, in the repeating iteration of the steps (b), (c) and (d) in accordance with the repeating step (e), the performing step (d) comprises the step of performing the channel estimation and the equalization on the additional symbols of the signal using the selected technique.

4. The method according to claim 1, wherein each of the symbols of the signal is a symbol of the received signal.

5. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
  (a) providing a plurality of techniques for channel estimation and equalization of the received signal;
  (b) receiving at least one of the symbols of the signal;
  (c) selecting one of the techniques to be used on the received symbols or on additional at least one of the symbols of the signal;
  (d) performing the channel estimation and the equalization on the received symbols of the signal; and
  (e) repeating the providing step (a), the receiving step (b), the selecting step (c) and the performing step (d),
  wherein the selecting step (c) further comprises the steps of performing the channel estimation and the equalization on the received symbols of the signal for each of the techniques using all of the sub-carriers in the received symbols and comparing results of all of the techniques,
  from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, and
  the comparing step further comprises the step of comparing an average of the distortion parameter of each technique, which is averaged over all the sub-carriers in the received symbols of the signal.

6. The method according to claim 5, wherein the technique which results in the smallest average of the distortion parameter is selected.

7. The method according to claim 5, wherein the technique which has the lowest power consumption is selected, as long as the average of the distortion parameter falls within a predetermined acceptable range.

8. The method according to claim 5, wherein if the selecting step (c) comprises the step of selecting one of the techniques to be used on the received symbols of the signal, the performing step (d) comprises the step of performing the channel estimation and the equalization on the received symbols of the signal using the selected technique.

9. The method according to claim 5, wherein if the selecting step (c) comprises the step of selecting one of the techniques to be used on the additional symbols of the signal, in the repeating iteration of the steps (b), (c) and (d) in accordance with the repeating step (e), the performing step (d) comprises the step of performing the channel estimation and the equalization on the additional symbols of the signal using the selected technique.

10. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
  (a) providing a plurality of techniques for channel estimation and equalization of the received signal;
  (b) receiving at least one of the symbols of the signal;
  (c) selecting one of the techniques to be used on the received symbols or on additional at least one of the symbols of the signal;
  (d) performing the channel estimation and the equalization on the received symbols of the signal; and
  (e) repeating the providing step (a), the receiving step (b), the selecting step (c) and the performing step (d),
  wherein the selecting step (c) further comprises the steps of performing the channel estimation and the equalization on the received symbols of the signal for each of the techniques using all of the sub-carriers in the received symbols, and comparing results of all of the techniques, and
  the performing step (d) further comprises the step of re-performing the channel estimation and the equalization on the received symbols of the signal using the selected technique.

11. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
  (a) providing a plurality of techniques for channel estimation and equalization of the received signal;
  (b) receiving at least one of the symbols of the signal;
  (c) selecting one of the techniques to be used on the received symbols or on additional at least one of the symbols of the signal;
  (d) performing the channel estimation and the equalization on the received symbols of the signal; and
  (e) repeating the providing step (a), the receiving step (b), the selecting step (c) and the performing step (d),
  wherein the selecting step (c) further comprises the steps of performing the channel estimation and the equalization on the received symbols of the signal for each of the techniques using some but not all of the sub-carriers in the received symbols, and comparing results of all of the techniques, and
  from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, the distortion parameter for each sub-carrier comprising a distance in a complex plane between an ideal position of the sub-carrier in the complex plane and an actual position of the equalized sub-carrier in the complex plane.

12. The method according to claim 11, wherein a subset of the sub-carriers selected for performing the channel estimation and the equalization comprises continuous pilot sub-carriers and TPS pilot sub-carriers.

13. The method according to claim 11, wherein, if the selecting step (c) comprises the step of selecting one of the techniques to be used on the received symbols of the signal, the performing step (d) comprises the step of performing the channel estimation and the equalization on the received symbols of the signal using the selected technique.

14. The method according to claim 11, wherein, if the selecting step (c) comprises the step of selecting one of the techniques to be used on the additional symbols of the signal, in the repeating iteration of the steps (b), (c) and (d) in accordance with the repeating step (e), the performing step (d)

comprises the step of performing the channel estimation and the equalization on the additional symbols of the signal using the selected technique.

15. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
   (a) providing a plurality of techniques for channel estimation and equalization of the received signal;
   (b) receiving at least one of the symbols of the signal;
   (c) selecting one of the techniques to be used on the received symbols or on additional at least one of the symbols of the signal;
   (d) performing the channel estimation and the equalization on the received symbols of the signal; and
   (e) repeating the providing step (a), the receiving step (b), the selecting step (c) and the performing step (d),
   wherein the selecting step (c) further comprises the steps of performing the channel estimation and the equalization on the received symbols of the signal for each of the techniques using some but not all of the sub-carriers in the received symbols and comparing results of all of the techniques,
   from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, and
   the comparing step further comprises the step of comparing an average of the distortion parameter of each technique, which is averaged over all the sub-carriers used for performing the channel estimation and the equalization.

16. The method according to claim 15, wherein the technique which results in the smallest average of the distortion parameter is selected.

17. The method according to claim 15, wherein the technique which has the lowest power consumption is selected, as long as the average of the distortion parameter falls within a predetermined acceptable range.

18. The method according to claim 15, wherein, if the selecting step (c) comprises the step of selecting one of the techniques to be used on the received symbols of the signal, the performing step (d) comprises the step of performing the channel estimation and the equalization on the received symbols of the signal using the selected technique.

19. A method according to claim 15, wherein if the selecting step (c) comprises the step of selecting one of the techniques to be used on the additional symbols of the signal, in the repeating iteration of the steps (b), (c) and (d) in accordance with the repeating step (e), the performing step (d) comprises the step of performing the channel estimation and the equalization on the additional symbols of the signal using the selected technique.

20. The method according to claim 15, wherein a subset of the sub-carriers selected for performing the channel estimation and the equalization comprises continuous pilot sub-carriers and TPS pilot sub-carriers.

21. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
   (a) providing a plurality of techniques for channel estimation and equalization of the received signal;
   (b) receiving at least one of the symbols of the signal;
   (c) selecting one of the techniques to be used on the received symbols or on additional at least one of the symbols of the signal;
   (d) performing the channel estimation and the equalization on the received symbols of the signal; and
   (e) repeating the providing step (a), the receiving step (b), the selecting step (c) and the performing step (d),
   wherein the selecting step (c) further comprises:
   storing a running average of distortion parameters, which is averaged over at least some of the sub-carriers in the received symbols, for each of the techniques, the distortion parameter for each sub-carrier for each technique defining a measure of a difference between an actual equalized sub-carrier and an ideal sub-carrier for a particular modulation scheme used;
   performing the channel estimation and the equalization on the received symbols of the signal for only a subset of the techniques;
   from results of the channel estimation and the equalization, deriving an average of the distortion parameter for each technique of the subset of the techniques;
   updating the running average of the distortion parameters for each technique of the subset of the techniques, using the derived average of the distortion parameters; and
   comparing the current running average of the distortion parameters for all of the plurality of techniques.

22. The method according to claim 21, wherein the distortion parameter for each sub-carrier comprises a distance in a complex plane between an ideal position of the sub-carrier in the complex plane and an actual position of the equalized sub-carrier in the complex plane.

23. The method according to claim 21, wherein the technique which results in the smallest current running average of the distortion parameter is selected.

24. The method according to claim 21, wherein the technique which has the lowest power consumption is selected, as long as the current running average of the distortion parameter falls within a predetermined acceptable range.

25. The method according to claim 21, wherein the technique which results in the smallest current running average of the distortion parameter is selected.

26. The method according to claim 21, wherein the technique which has the lowest power consumption is selected, as long as the current running average of the distortion parameter falls within a predetermined acceptable range.

27. A method for optimizing the processing of a received Orthogonal Frequency Division Multiplexed signal, the signal comprising a plurality of symbols in a time direction, each symbol comprising a plurality of sub-carriers in a frequency direction, the method comprising the steps of:
   (a) providing a plurality of methods for channel estimation and equalization of the received signal;
   (b) receiving at least one of the symbols of the signal;
   (c) storing running average of distortion parameters, which is averaged over at least some of the sub-carriers in the received symbols, for each of the methods, the distortion parameter for each sub-carrier for each method defining a measure of a difference between an actual equalized sub-carrier and an ideal sub-carrier for a particular modulation scheme;
   (d) performing the channel estimation and the equalization on the received symbols of the signal for only a subset of the plurality of methods;
   (e) from results of the channel estimation and the equalizations, deriving an average of the distortion parameter for each method in the subset of the plurality of methods;

(f) updating the running average of the distortion parameters for each method of the subset of the plurality of methods, using the derived average of the distortion parameters; and (g) selecting one of the methods to be used on the received symbols or an additional at least one of the symbols of the signal by comparing the current running average of the distortion parameters of all of the methods;

(h) performing the channel estimation and the equalization on the received symbols of the signal; and (i) repeating the steps (b) to (h).

28. A receiver for optimizing the processing of a received Orthogonal Frequency Division Multiplexed signal, the signal comprising a plurality of symbols in a time direction, each symbol comprising a plurality of sub-carriers in a frequency direction, the receiver comprising:

a plurality of channel estimators and equalizers, each channel estimator and equalizer being arranged to apply a respective technique for channel estimation and equalization on the received signal; and means for selecting one of the channel estimators and equalizers to use on each symbol or symbols of the received signal, the selecting means further comprising means for performing the channel estimation and the equalization on the received symbols of the signal for each of the techniques using all the sub-carriers in the received symbols, and means for comparing results of all of the techniques, wherein, from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, and the selecting means is arranged to compare the results of all of the techniques by comparing an average distortion parameter of each technique, which is averaged over all the sub-carriers, and to select the technique which has the lowest power consumption, as long as the average of the distortion parameter falls within a predetermined acceptable range.

29. A receiver for optimizing the processing of a received Orthogonal Frequency Division Multiplexed signal, the signal comprising a plurality of symbols in a time direction, each symbol comprising a plurality of sub-carriers in a frequency direction, the receiver comprising:

a plurality of channel estimators and equalizers, each channel estimator and equalizer being arranged to apply a respective technique for channel estimation and equalization on the received signal; and means for selecting one of the channel estimators and equalizers to use on each symbol or symbols of the received signal, the selecting means further comprising means for performing the channel estimation and the equalization on the received symbols of the signal for each of the techniques using only a subset of the sub-carriers in the received symbols, and means for comparing results of all of the techniques, wherein, from the results of all of the techniques, a distortion parameter is derived for each of the sub-carriers in the received symbols for each of the techniques, the distortion parameter defining a measure of a difference between an actual equalized sub-carrier and an ideal sub-carrier for a particular modulation scheme, and the selecting means is arranged to compare the results of all of the techniques by comparing an average of the distortion parameter of each technique, which is averaged over all the sub-carriers in the subset of the sub-carriers, and to select the technique which has the lowest power consumption, as long as the average of the distortion parameter falls within a predetermined acceptable range.

* * * * *